Patented May 5, 1936

2,040,053

UNITED STATES PATENT OFFICE 2,040,053

ALLOY

Arthur R. Lytle, Flushing, N. Y., assignor, by mesne assignments, to Union Carbide and Carbon Corporation, a corporation of New York No Drawing. Application October 31, 1933, Serial No. 696,025

4 Claims. (Cl. 75—156)

The present invention relates to metallic compositions, and more particularly to such compositions which are useful for bearing purposes and as welding rods for building up such bearing compositions.

A well recognized principle of the oxy-acetylene welding art is the use of a strongly oxidizing flame when welding copper alloys such as brass and bronze, for with this type of flame most of the common copper alloys may be successfully welded and the weld metal will be free from porosity. However, considerable difficulties are encountered when attempts are made to weld copper alloys having a high lead content, such as bearing compositions, for example, since in this case a more strongly oxidizing flame is necessary than when welding copper alloys containing no lead. The excessively oxidizing character of this flame leads to the formation of a heavy refractory coating of slag in the welding puddle and difficulty is met with in floating this slag to the surface. As a satisfactory compromise cannot be reached, the welding of this type of alloys has always been considered a very unsatisfactory operation.

An object of this invention is to improve the welding qualities of copper alloys having a high lead content, so that it is possible, when using the proper welding flame, to obtain a weld deposit which is of uniform composition and substantially free from porosity, slag or oxide inclusions, and other defects.

Another object of this invention is to produce lead-containing bearing bronzes which are hardened by the addition of silicon.

In accordance with the principles of this invention, the above objects are attained and the difficulties mentioned are avoided by adding silicon to lead-containing copper alloys having a high lead content, whereby there is obtained a novel type of alloy having a hard matrix in spite of a high lead content. Although silicon has generally been considered undesirable by bronze founders as an addition to bronze for castings, in accordance with this invention if silicon is added to lead-containing bronzes in amounts up to about 5% and not less than 0.25% it is beneficial and produces a material suitable for bearing purposes or a welding rod having novel valuable properties. With the amounts of silicon stated, the hardness of the matrix is considerably increased and at the same time the high lead content desired for bearing surfaces may be safely maintained. This combination of greater hardness in spite of a high lead content results in a longer useful life for bearings as compared with bearings without silicon and improves the weldability thereof.

It has also been found that, in welding rods, in addition to silicon, zinc, either with or without phosphorus, is of further advantage in improving the flowing quality and soundness of the deposited metal. Furthermore, although silicon is generally preferred as a hardening agent, either magnesium or aluminum may be substituted therefor, in considerably smaller proportions. With a silicon content of the order of 3 to 4%, the tin content may be lowered proportionately. A tin content of 8% to 10% provides the proper proportion of hard microconstituents with the softer matrix obtained in alloys having a low silicon content.

A suitable basic composition or base alloy, which may be improved in accordance with the principles of this invention, is substantially as follows:

| | Percent |
|---|---|
| Lead | 8 to 18 |
| Tin | 6 to 10 |
| Copper | the remainder |

This composition is generally known as a bearing alloy. It has been found that to improve the welding characteristics and bearing properties of this alloy, the addition of as small an amount of silicon as 0.25% is effective, although as much as 5% silicon may be desirable in some particular cases. I have also found that the alloys having a silicon content below about 1% are relatively soft and not essentially different in physical properties from the base alloy, regardless of the zinc content. However, as the silicon content is increased over 1%, the hardness of the alloy increases rapidly until with about 6% silicon, a somewhat brittle alloy is obtained. Therefore, there are, in general, at least two types of alloys which may be used for bearing purposes or for welding rods for building up bearings.

Instead of silicon, it is possible to use either magnesium or aluminum as a hardening and scavenging agent. Both of these latter elements are strong slagging agents and readily form a slag over the surface of the metal, under which the welding takes place quite satisfactorily. Small amounts of either of these elements are beneficial, but as much as 3% aluminum may be used without detriment. Generally, whether silicon, magnesium or aluminum is used as a deoxidizer or hardener, zinc is of sufficient benefit to be added also, and for this purpose from 3 to 5% zinc seems to be best.

Phosphorus may be used concurrently with silicon. Phosphorus-containing alloys are especially free-flowing, and the deposited metal is free from porosity. Phosphorus also possesses the ability to harden copper since it forms copper-phosphide, a hard constituent which lengthens the useful life of bearings of which it is a constituent.

It may be advantageous to add relatively small amounts of nickel to some of the alloys described herein. Nickel apparently has two functions: first it helps to sustain the lead in suspension so that it is uniformly distributed throughout the alloy; second, it combines with silicon to form nickel-silicide, which in itself is a hardening agent for copper alloys.

A few typical alloy compositions made in accordance with the principles of this invention are as follows:

| Copper | Lead  | Tin  | Silicon | Zinc  | Nickel |
|--------|-------|------|---------|-------|--------|
| 79.5%  | 11.4% | 6.65%| 0.95%   |       |        |
| 74.1   | 10.3  | 7.5  | 0.80    | 5.19% |        |
| 77.8   | 10.8  | 6.9  | 0.63    |       | 1.8    |
| Bal.   | 12.3  | 8.0  | 0.70    |       |        |
| 76.9   | 12.0  | 7.1  | 0.31    | 2.80  |        |
| 72.7   | 14.7  | 8.0  | 0.84    | 4.0   |        |
| 70.4   | 13.1  | Bal. | 2.0     | 5.1   | 2.3    |
| 79.5   | 10.2  | 8.5  | 2.6     | 1.1   |        |

The alloy of the invention thus comprises a lead bronze containing a powerful deoxidizing agent such as silicon, aluminum or magnesium, a fluidifying agent such as silicon, phosphorus or zinc, and a hardening agent such as silicon, phosphorus or nickel.

What is claimed is:

1. An alloy having the composition: 8% to 18% lead, 6% to 10% tin, 0.25% to 5% silicon, and the remainder copper.

2. An alloy having the composition: 12% to 15% lead, 8% to 10% tin, 0.5% to 1.25% silicon, and the remainder copper.

3. An alloy having the composition: 12% to 15% lead, 8% to 10% tin, 2% to 4% silicon, and the remainder copper.

4. A welding rod having the composition: 12% to 15% lead, 8% to 10% tin, 0.5% to 5% silicon, and the remainder copper.

ARTHUR R. LYTLE.